United States Patent
Szymanski et al.

(10) Patent No.: US 12,047,243 B2
(45) Date of Patent: Jul. 23, 2024

(54) SYNTHETIC NETWORK GENERATOR FOR COVERT NETWORK ANALYTICS

(71) Applicants: Boleslaw Karol Szymanski, Loudonville, NY (US); Amr Elsisy, Troy, NY (US); Aamir Mandviwalla, Troy, NY (US)

(72) Inventors: Boleslaw Karol Szymanski, Loudonville, NY (US); Amr Elsisy, Troy, NY (US); Aamir Mandviwalla, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 17/708,212

(22) Filed: Mar. 30, 2022

(65) Prior Publication Data
US 2022/0407780 A1    Dec. 22, 2022

Related U.S. Application Data (60) Provisional application No. 63/324,810, filed on Mar. 29, 2022, provisional application No. 63/286,505, filed on Dec. 6, 2021, provisional application No. 63/168,216, filed on Mar. 30, 2021.

(51) Int. Cl.
*H04L 41/12* (2022.01)
*H04L 41/044* (2022.01)
*H04L 41/14* (2022.01)

(52) U.S. Cl.
CPC ............ *H04L 41/12* (2013.01); *H04L 41/044* (2013.01); *H04L 41/145* (2013.01)

(58) Field of Classification Search
CPC .............................. H04L 41/12; H04L 41/145
USPC ........................................................ 709/223
See application file for complete search history.

(56) References Cited

U.S. PATENT DOCUMENTS

| | | | |
|---|---|---|---|
| 6,285,999 | B1 | 9/2001 | Page |
| 6,711,615 | B2 | 3/2004 | Porras et al. |
| 7,152,065 | B2 | 12/2006 | Behrens et al. |
| 8,312,021 | B2 | 11/2012 | Matveeva et al. |

(Continued)

FOREIGN PATENT DOCUMENTS

CN    109615550 A   *  4/2019

OTHER PUBLICATIONS

Elsisy et al., A Synthetic Network Generator for Covert Network Analytics, Aug. 10, 20, All Pages (Year: 2020).*

(Continued)

*Primary Examiner* — Hee Soo Kim
(74) *Attorney, Agent, or Firm* — Barclay Damon LLP; Anthony P. Gangemi (57) ABSTRACT

A method of generating a synthetic network includes receiving, by a group structure identification module, anonymized input data related to an original network. The anonymized input data includes an anonymized list of nodes, a list of edges and a list of groups. The method further includes determining, by the group structure identification module, for each pair of nodes, a probability of an edge between the pair of nodes. A resulting list of probabilities corresponds to a summary group structure. The method further includes generating, by a synthetic random network generation module, at least one synthetic random network based, at least in part, on the determined probabilities.

20 Claims, 2 Drawing Sheets

(56) References Cited

U.S. PATENT DOCUMENTS

| | | |
|---|---|---|
| 8,850,571 B2 | 9/2014 | Staniford et al. |
| 8,887,286 B2 | 11/2014 | Dupont et al. |
| 8,935,275 B2 * | 1/2015 | Rathod .............. G06Q 30/0282 |
| | | 707/706 |
| 9,026,535 B2 | 5/2015 | Jakubik |
| 9,224,067 B1 | 12/2015 | Lu et al. |
| 9,262,514 B2 | 2/2016 | Eckardt, III et al. |
| 10,726,356 B1 | 7/2020 | Zarandioon et al. |
| 10,853,136 B2 | 12/2020 | Shear et al. |
| 10,884,803 B2 | 1/2021 | Shear et al. |
| 11,290,338 B1 * | 3/2022 | DeCleene ............. H04L 41/145 |
| 11,599,840 B2 * | 3/2023 | Cheng ................... G06N 20/00 |
| 2015/0254566 A1 | 9/2015 | Chandramouli et al. |
| 2020/0349324 A1 | 11/2020 | Ostby et al. |
| 2021/0329026 A1 * | 10/2021 | Bogdan ................... G06N 7/08 |
| 2022/0086174 A1 * | 3/2022 | Helmsen ................ G06N 3/042 |
| 2022/0217056 A1 * | 7/2022 | Shao ....................... H04L 43/55 |

OTHER PUBLICATIONS

Abbe, E., "Community Detection and Stochastic Block Models: Recent Developments," Journal of Machine Learning Research, vol. 18, pp. 1-86, Apr. 2018.

Elsisy, A., et al., "What Makes Social Search Efficient," arXiv, 1904.06551v1, pp. 1-11, Apr. 13, 2019.

\* cited by examiner

SYNTHETIC NETWORK GENERATOR FOR COVERT NETWORK ANALYTICS

CROSS REFERENCE TO RELATED APPLICATION(S)

This application claims the benefit of U.S. Provisional Application No. 63/168,216, filed Mar. 30, 2021, U.S. Provisional Application No. 63/286,505, filed Dec. 6, 2021, and U.S. Provisional Application No. 63/324,810, filed Mar. 29, 2022, which are incorporated by reference as if disclosed herein in their entireties.

GOVERNMENT LICENSE RIGHTS

This invention was made with government support under grant award number 2017-ST-061-CINA01, awarded by the U.S. Department of Homeland Security, contract number W911NF-17-C-0099, awarded by the Defense Advanced Research Projects Agency (DARPA) and, grant number W911NF-16-1-0524 awarded by the Army Research Office (ARO). The government has certain rights in the invention.

FIELD

The present disclosure relates to a synthetic network generator, and, more specifically, to a synthetic network generator for covert analytics.

BACKGROUND

Members of covert (i.e., hidden) social networks, may generally attempt to hide their membership, network structures, and activities. Such covert networks may include, but are not limited to, terrorist and criminal networks. Thus, data about covert networks is often incomplete and/or partially incorrect, making interpreting structures and activities of such networks challenging. Additionally or alternatively, actual data about active covert networks may generally be inaccessible to, for example, researchers.

SUMMARY

In an embodiment, there is provided a method of generating a synthetic network. The method includes receiving, by a group structure identification module, anonymized input data related to an original network. The anonymized input data includes an anonymized list of nodes, a list of edges and a list of groups. The method further includes determining, by the group structure identification module, for each pair of nodes, a probability of an edge between the pair of nodes. A resulting list of probabilities corresponds to a summary group structure. The method further includes generating, by a synthetic random network generation module, at least one synthetic random network based, at least in part, on the determined probabilities.

In some embodiments, the method further includes classifying, by the group structure identification module, each edge into a selected class, and generating, by the group structure identification module, a corresponding randomized weight for each class separately.

In some embodiments of the method, the original network is selected from the group including an actual network or another synthetic network.

In some embodiments of the method, the generating at least one synthetic random network corresponds to generating a set of synthetic random networks that are statistically similar.

In some embodiments, the method further includes generating, by a data anonymization module, the anonymized input data.

In some embodiments of the method, the anonymized input data further includes incorrect data related to the original network.

In some embodiments of the method, the list of nodes includes a plurality of node records. Each node record includes a unique node identifier and a management hierarchy indicator. The list of edges includes a plurality of edge records. Each edge record includes a starting node identifier, an ending node identifier, and an edge weight. The list of groups includes at least one group record. Each group record includes a list of node identifiers corresponding to members of the group.

In some embodiments, the method further includes assigning, by the group structure identification module, a randomized weight to each weighted edge using at least one of a weighted random graph technique and/or a Bernoulli weighted random network technique.

In some embodiments of the method, the generating at least one synthetic random network corresponds to an extension of a Stochastic block model.

In some embodiments, the method further includes assigning, by the group structure identification module, a management role to a selected node.

In an embodiment, there is provided a synthetic network generator system for covert networks. The system includes a group structure identification module configured to receive anonymized input data related to an original network. The anonymized input data includes an anonymized list of nodes, a list of edges and a list of groups. The group structure identification module is further configured to determine, for each pair of nodes, a probability of an edge between the pair of nodes. A resulting list of probabilities corresponds to a summary group structure. The system further includes a synthetic random network generation module configured to generate at least one synthetic random network based, at least in part, on the determined probabilities.

In some embodiments of the system, the group structure identification module is further configured to classify each edge into a selected class, and to generate a corresponding randomized weight for each class separately.

In some embodiments of the system, the original network is selected from the group including an actual network or another synthetic network.

In some embodiments of the system, the generating at least one synthetic random network corresponds to generating a set of synthetic random networks that are statistically similar.

In some embodiments, the system further includes a data anonymization module configured to generate the anonymized input data.

In some embodiments of the system, the anonymized input data further includes incorrect data related to the original network.

In some embodiments of the system, the list of nodes includes a plurality of node records. Each node record includes a unique node identifier and a management hierarchy indicator. The list of edges includes a plurality of edge records. Each edge record includes a starting node identifier, an ending node identifier, and an edge weight. The list of groups includes at least one group record. Each group record includes a list of node identifiers corresponding to members of the group.

In some embodiments of the system, the group structure identification module is configured to assign a randomized weight to each weighted edge using at least one of a weighted random graph technique and/or a Bernoulli weighted random network technique.

In some embodiments of the system, the generating at least one synthetic random network corresponds to an extension of a Stochastic block model.

In some embodiments of the system, the group structure identification module is configured to assign a management role to a selected node.

BRIEF DESCRIPTION OF DRAWINGS

The drawings show embodiments of the disclosed subject matter for the purpose of illustrating features and advantages of the disclosed subject matter. However, it should be understood that the present application is not limited to the precise arrangements and instrumentalities shown in the drawings, wherein.

Although the following Detailed Description will proceed with reference being made to illustrative embodiments, many alternatives, modifications, and variations thereof will be apparent to those skilled in the art.

DETAILED DESCRIPTION

A common trait of covert networks is that members generally try to hide their membership structure and, for criminal or terrorist networks, their illegal activities. The membership in such networks is often secretive. Their relatively important interactions may be covert, so their relatively unimportant interactions may seem overly visible, possibly masking relatively important interactions. Law enforcement is generally constrained in their methods of collecting data by, for example, privacy laws. As a result, the data about covert networks may be incomplete and/or at least partially incorrect. Thus, interpreting or discerning the structure and activities of such networks may be particularly challenging. Additionally or alternatively, data about networks under investigations may be inaccessible to researchers.

Generally, a method, apparatus, and/or system, according to the present disclosure, is configured to generate a set of synthetic networks, with each synthetic network structurally similar to an original network. In an embodiment, the original network may correspond to an actual network. In another embodiment, the original network may correspond to another synthetic network. Members of an actual network may be individuals and each individual may correspond to a node in a synthetic network. Each synthetic network may contain a plurality of anonymous nodes that are interconnected or clustered similar to, but slightly different from, the nodes in the original network. In one nonlimiting example, the synthetic networks may then be used to train research and/or analytical tools for finding structure and/or dynamics of actual covert networks.

The synthetic networks may support a plurality of alternative interpretations of the data regarding the original network. A distribution of probabilities for the alternative interpretations may enable users of the data to quantify statistically expected outcomes of operations on the covert networks. The distribution of probabilities for the alternative interpretations may provide an indication whether the data collected for selected covert network is sufficient for reliably interpreting the selected network's structure and/or dynamics. For example, a relatively high frequency of alternative interpretations of the original network structure may make them relatively more likely candidates for ground truth structure. Additional data may then support a determination of which interpretation relatively more likely corresponds to a true structure of the original network.

In another example, the generated synthetic networks, according to the present disclosure, may be useful for analyzing the social networks with partial information about their structures. In another example, the generated synthetic networks, according to the present disclosure, may be useful for analyzing biomedical networks in which a massive collection of experimental data about network dynamics may include data that is at least partially incomplete and/or at least partially incorrect.

It may be appreciated that discovery and monitoring of covert networks often rely on getting access to information flows among nodes, e.g., individuals, suspected to be involved in network activities. This flow may involve one or more of wiretapped telephone interactions, message exchanges, recorded conversations, or copies of written documents. A covert organization may be represented by a covert network. A node that is included in the covert network may correspond to a member of the covert organization. Using community detection, a covert network may include groups of members who interact among themselves more often than with other members. In small organizations, groups may be independent of the organizational structure of the network, or they may have a hierarchical structure for management nodes. The number of hierarchy levels may be related to the organization size. As used herein, each group may be represented by one or more group parameters. Group parameters may include, but are not limited to, average density of edges inside the group, average density of edges from a selected group to other groups, and a respective placement of each group member in an organization hierarchy. As used herein, an edge corresponds to a connection between two nodes. The connection may represent communication (e.g., telephone call, conversation captured via surveillance). For example, one or more group parameters may be used to individualize group leader connections to members of its group, and/or separately, to other nodes. Given an original network, a synthetic network generator, according to the present disclosure, is configured to individualize the original network by randomly rewiring edges of its groups and its management hierarchy. Thus, a synthetic network generator, according to the present disclosure, may be configured to combine two network models: a stochastic block model (SBM) for groups and a hierarchical network for management structure.

It may be appreciated that acquiring data for actual covert organizations may rely on intercepting communications and/or on surveillance, of identified members of a selected organization. Acquired data may include, but is not limited to, records of telephone calls between organization members, that may include timing, frequency, call initiator identifier, call recipient identifier, for each telephone call, etc., records from conversation surveillance, that may include timing, frequency, respective participant identifier for each participating group member, etc. Network nodes may then correspond to call initiators and call recipients and/or conversation participants, and an edge weight may correspond to a number of calls (and/or a number of conversations) between two selected nodes during a defined time period, e.g., a number of months. Acquired or known data may further include events affecting the organization, e.g., associated interdiction, movement of member(s) within a management structure of an organization. The data may be collected over a time period and/or as snapshots in time at each of a plurality of time intervals. Fewer than all members of an organization may be identified.

It may be further appreciated that based, at least in part, on acquired organization data, one or more groups and/or one or more managers may be identified. In one nonlimiting example, a Louvain method for community detection may be used to extract one or more groups from organization data and a relative betweenness centrality may be used to find nodes involved in managerial roles. It may be appreciated that criminal networks may have sparse connectivity because of attempts to hide network activities, thus, a Louvain technique configured for graphs with undirected edges may be used. However, this disclosure is not limited in this regard. Other community detection techniques may include, but are not limited to, SpeakEasy community detection, constant Potts model (CPM), modularity maximization, fast modularity, adaptive modularity, etc.

Continuing with the Louvain technique, directed edges of the generated networks may be transformed into undirected ones, summing their weights for pairs of nodes which have two opposing edges connecting them. Covert networks may prioritize either efficiency or security, but generally not both. The betweenness centrality of a node is a measure of a fraction of the shortest paths of information flow between all pairs of nodes passing through this node. A normalized version of this metric, called relative betweenness centrality, limits its range to [0,1]. The normalized version may facilitate comparison of the results between groups and/or organizations.

In an embodiment, a network generation process for a Random Anonymized Network Generator (RANG) may be configured to generate a network. In an embodiment, the RANG may be organized into a plurality (e.g., three) of sets of operations. The sets of operations may include, but are not limited to, data anonymization, group structure identification, and synthetic random network generation. As used herein, the labels for sets of operations are labels of convenience and not of limitation, thus, this disclosure is not limited in this regard. A first set of operations ("data anonymization"), may be performed by, and/or under control of, a source (e.g., owner) of the original network data. Data anonymization operations are configured to anonymize (i.e., remove identifying information regarding) network node data. Data anonymization operations may include assigning a unique node identifier (ID) to each node. In one nonlimiting example, the unique node ID may be numeric. The unique node identifier is configured to replace each node identity and corresponding personal data by a unique ID of this node, that provides or preserves anonymity of the group member, manager or boss, corresponding to the node. Data anonymization operations may further include assigning to each node its respective place in the management hierarchy and a group to which this node belongs. In one nonlimiting example, each group may be identified by a respective group ID, that may be numeric or alphanumeric. Data anonymization operations may include generating, for each node, a list of subordinate node(s) and a list of superior node(s). The subordinate and/or superior nodes may be represented by their respective unique node IDs. It may be appreciated that, for some nodes, the list of subordinate node(s) and/or the list of superior node(s) may be null, i.e., may not include any other node IDs. Thus, node identifying information may be removed, and network organization structure may be summarized.

A second set of operations (group structure identification) may be performed by a RANG module. Group structure identification operations are configured to summarize a group structure of a network. In an embodiment, the group structure of the network may be summarized as a list of probabilities of an edge between any pair of nodes. These probabilities are related to the group(s) to which the nodes belong and the roles these nodes play in the network. For example, each pair of nodes may have a corresponding respective probability of an edge coupling the two nodes in the pair of nodes. The obtained data may be shared with the outside users or used internally by the owners.

The third set of operations (synthetic random network generation) is configured to generate a set of synthetic random networks. The synthetic random network generation may utilize one or more of the edge probabilities generated by the group structure identification operations. The third set of operations may include analyzing the set of synthetic random networks for a group structure stability. The third set of operations may further include analyzing the set of synthetic random networks to evaluate each node's management role(s) consistency.

It may be appreciated that social networks may have directed weighted edges configured to represent intensity of interactions. Intensity of interactions may be measured, for example, in frequency of calls, messages, or meetings. Weights may be assigned to edges by one or more techniques. Weight assignment techniques may include, but are not limited to a Weighted Random Graph (WRG) generator, and/or Bernoulli Weighted Random Network (BWRN) model.

In the Weighted Random Graph (WRG) generator, an edge's weight may be generated by running Bernoulli trials with probability p=W/(W+E), where W is a sum of the weights of all edges and E is a maximum number of edges that may be generated between subsets of nodes. As is known, a Bernoulli trial is a random experiment with exactly two possible outcomes, "success" or "failure", and in which the probability of success is the same every time the experiment is conducted (i.e., run). A run stops at a first failed trial. A number of successful trials before this first failure may then define a corresponding weight of the generated edge. The WRG generator process is configured to yield a geometric distribution of edge weights.

The Bernoulli Weighted Random Network (BWRN) technique (i.e., model) may include two parameters. A first BWRN parameter corresponds to a vector of the weights, w's, for the edges in the original graph. A second BWRN parameter corresponds to a probability $p_B$ that controls a variance of the generated weight distribution. The BWRN process of generating edges may start with the relatively heaviest edges and progress down to edges with the relatively smallest weight. Given a currently processed weight w, an associated weight may be determined as $w_B = \lfloor w/p_B \rfloor$. For each edge with weight w in the original graph, a weight in the range $[0, \lceil w/p_B \rceil]$ may be selected as follows. First, a pair of not yet connected nodes is randomly selected and $w_B$ Bernoulli trials are run with probability $p_B$. If $p_B w_B < w$, one more Bernoulli trial is run, with probability $p_a = w - p_B w_B$. The weight from such a run is equal to the number of successes in those trials. An edge is not created when this run returns weight 0.

The BWRN technique is configured to yield a distribution of weights with probability of choosing weight k (where $0 \leq k \leq \lceil w/p_B \rceil$) defined as:

$$p_w(k, p_B) = \begin{cases} \frac{(w)!}{(w-k)!k!} p_B^k (1-p_B)^{w-k} & \text{if } k \leq w_B \\ w - p_B w_B & \text{for } k = w_B + 1 \text{ if } p_B w_B < w \end{cases} \quad (1)$$

Thus, an average sum of weights of all edges created by this technique is may be the same as in the original network because the expected weight from Equation 1 is $p_B w_B + w - p_B w_B = w$.

The parameter $p_B$ defines probability that the edge of weight w will not be generated, which is $(1-p_B)^w$ if $w = p_B w_B$ and $(1-p_B)^w (1-w+p_B w)$ otherwise, so it quickly decreases with increase of w and $p_B$. For example, with $p_B > 0.9$, edges with weight 1 have a relatively low chance (i.e., below 1%) to be lost. A trade-off may arise for slightly lower values of $p_B$. For example, with $p_B = 0.875$, about 10% of such edges will not appear in the generated network, but a similar fraction of edges may increase their weight to 2, thus, strengthening a cohesiveness of some communities A variance of the distribution of the weights generated for an edge with weight w in the original data is $w(1-p_B)+p_a(p_b-p_a) \approx w(1-p_B)$, so it grows with increase in w but decays with increase of $p_B$. Thus, selecting large $p_B$ may make generated synthetic networks more similar to the original network, while decreasing $p_B$ may have opposite effects. Hence, different kinds of analyses may be conducted with different choices of $p_B$.

By taking into account weights of edges, the BWRN model is configured to allow a user to define different edge densities in a group for edges at a same level of hierarchy (e.g., among peers) than for edges across the hierarchy (e.g., between the group leader and a subordinate). The user may thus account for typically higher information flow intensities between managers and subordinates than among peers.

Thus, weights may be assigned to edges.

It may be appreciated that network hierarchy levels may be detected to reveal the structural properties of the generated networks. The relative betweenness centrality may be used as a hierarchy level measure because in networks there is a strong correlation between the hierarchy measures and betweenness centrality scores. Comparing the nodes with high relative betweenness centrality in a generated network and such nodes in a corresponding original network are configured to support generating a measure how well the generated networks preserve leadership hierarchy. A Combined Score (CS) measures overall similarity of generated networks to the original network. CS is a product of the group and hierarchy similarities.

In an embodiment, there is provided a method of generating a synthetic network. The method of generating a synthetic network includes receiving, by a group structure identification module, anonymized input data related to an original network. The anonymized input data includes an anonymized list of nodes, a list of edges and a list of groups. The method further includes determining, by the group structure identification module, for each pair of nodes, a probability of an edge between the pair of nodes. A resulting list of probabilities corresponds to a summary group structure. The method further includes generating, by a synthetic random network generation module, at least one synthetic random network based, at least in part, on the determined probabilities.

Figure 1:
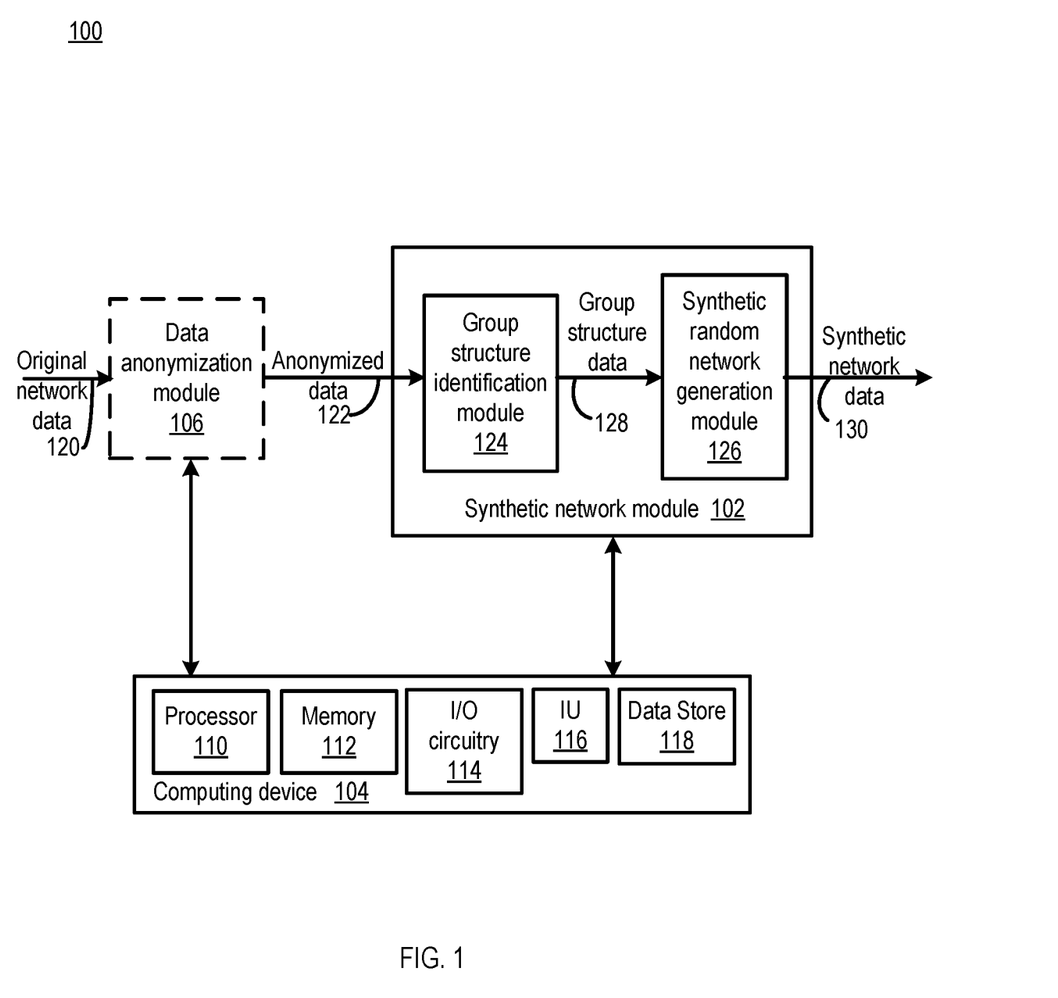
FIG. 1 illustrates a functional block diagram of a synthetic network generator system for covert network analytics, according to several embodiments of the present disclosure.

FIG. 1 illustrates a functional block diagram of a synthetic network generator system 100 for covert network analytics, according to several embodiments of the present disclosure. Synthetic network generator system 100 includes a synthetic network module 102, a computing device 104, and may include a data anonymization module 106. Synthetic network module 102 and/or data anonymization module 106 may be coupled to or included in computing device 104. Synthetic network module 102 includes a group structure identification module 124, and a synthetic random network generation module 126.

Generally, the synthetic network generator system 100 for covert network analytics is configured to receive original network data that may include actual network data or synthesized network data. The actual network data may correspond to proprietary network data. The actual network data may be anonymized, an associated network structure may be determined, and a plurality of corresponding synthetic networks may be generated, that may then be used to analyze operation of the network(s).

The data anonymization module 106 is configured to receive original network data 120, and to provide anonymized data 122 as output. The synthetic network module 102 (e.g., group structure identification module 124) is configured to receive the anonymized data 122. The group structure identification module 124 is configured to provide group structure data 128. The synthetic random network generation module 126 is configured to receive the group structure data 128. The synthetic network module 102 (e.g., synthetic random network generation module 126) is configured to provide the synthetic network data 130.

Computing device 104 may include, but is not limited to, a computing system (e.g., a server, a workstation computer, a desktop computer, a laptop computer, a tablet computer, an ultraportable computer, an ultramobile computer, a netbook computer and/or a subnotebook computer, etc.), and/or a smart phone. Computing device 104 includes a processor 110, a memory 112, input/output (I/O) circuitry 114, a user interface (UI) 116, and data store 118.

Processor 110 is configured to perform operations of synthetic network module 102 and/or data anonymization module 106. Memory 112 may be configured to store data associated with synthetic network module 102 and/or data anonymization module 106. I/O circuitry 114 may be configured to provide wired and/or wireless communication functionality for synthetic network generator system 100. For example, I/O circuitry 114 may be configured to receive original network data 120 and to provide synthetic network data as output 122. In another example, I/O circuitry 114 may be configured to receive or provide anonymized data 122. UI 116 may include a user input device (e.g., keyboard, mouse, microphone, touch sensitive display, etc.) and/or a user output device, e.g., a display. Data store 118 may be configured to store one or more of original data 120, anonymized data 122, group structure data 128, and/or synthetic network data 130. Data store 118 may be configured to store network parameters associated with group structure identification module 124 and/or synthetic network generation module 126, and/or data associated with data anonymization module 106.

In operation, the synthetic network generator system 100 for covert network analytics may be configured to perform a set of operations, configured to generate a plurality of synthetic network data sets. In an embodiment, the sets of operations may include, but are not limited to, data anonymization, group structure identification, and synthetic random network generation.

A first set of operations may be performed by the data anonymization module 106. The anonymization module 106 is configured to receive original network data 120 that may not be anonymized. The anonymization module 106 may be further configured to anonymize the received original network data 120 to produce anonymized data 122. The anonymized data 122 may then be provided to the synthetic network module 102.

The first set of operations ("data anonymization"), may be performed by, and/or under control of, a source (e.g., owner) of the original network data, as described herein. The original network may be an actual network or a synthetic network. In an embodiment, the input data, i.e., anonymized data 122, corresponding to the original (actual or synthetic) network may be provided, by or under control of the source. As used herein, input data corresponds to anonymized data, e.g., anonymized data 122.

In an embodiment, the input data 122 may be configured as a plurality of lists that contain (anonymized) data about the original network. In one nonlimiting example, the input data may include three lists about this network. The input data is configured to be anonymized, thus, personal information about the nodes may be removed. The input data may thus include the plurality of lists of nodes. A first list may include a plurality of node records, with each record representing a node, and each record including a unique abstract (e.g., numeric) node identifier and a management hierarchy indicator corresponding to a level of management hierarchy to which this node belongs. A second list may include a plurality of records corresponding to the edges in the original network. Each edge record may include a starting node identifier corresponding to the starting node, an ending node identifier corresponding to the ending node, and an edge weight, for the edge. A third list may include one or more records corresponding to groups in the original network. Each group record may include a list of identifiers (i.e., node identifiers) corresponding to members of the group. The group membership may be determined based, at least in part, on the original network. A group record may further include a node identifier associated with a group leader flag, configured to identify a group leader. It may be appreciated that some groups may not have a group leader. As used herein, a group that does not include a group leader is considered to be independent. In an embodiment, the input data may correspond to a synthetic network, generated by, or under control of the owner(s) of the actual network data. The input synthetic network data may thus be in an appropriate format and the generated network may be different from the original, preserving anonymity.

A next (i.e., second) set of operations may be performed by the group structure identification module 124. The group structure identification module 124 is configured to receive the anonymized data 122, and to identify a group structure and to produce corresponding group structure data 128. The group structure data 128 may then be provided to the synthetic random network generation module 126.

The next set of operations may include group structure identification operations, performed by, for example, the group structure identification module 124. Group structure identification operations may begin with processing the input data (i.e., anonymized data 122) to determine a respective probability of existence and respective weight for each edge for a generated network. Operations may include assigning a randomized weight to each weighted edge. In an embodiment, the random weights may be assigned according to a model. The model may be selected from the group including a WRG technique, and a BWRN technique, as described herein.

The group structure identification operations may include classifying the edges into a plurality of classes and generating edges and weights for each class separately. A first class of edges may include internal edges of a group $g_i$ of size $|g_i|$ at a same level of management hierarchy. In other words, the first class is configured to include members, but not superiors, that are neighbors. The first class may thus include $E^i = |g_i| (|g_i|-1)$ directed edges. A sum of the weights of the directed edges may be denoted as $W^i$. A second class of edges may be configured to include edges across the members of two different groups $g_i$, $g_j$. The second class may thus include $E^{i,j} = |g_i| |g_j|$ such edges from $g_i$ to $g_j$ and $E^{i,j}$ in the opposite direction, i.e., going from $g_j$ to $g_i$. Sums of weights of the second class of edges may be denoted as $W^{i,j}$, $W^{j,i}$. A third class of edges may include edges from a superior, s(i) to the members of its group $g_i$ and from the group members to this superior. The third group of edges may thus include $E^{s(i),i} = E^{i,s(i)} = |g_i|$ of such edges in each direction. Sums of weights of the third class of edges may be denoted as $W^{s(i),i}$, $W^{i,s(i)}$. A number of all nodes not in a group $g_i$ at the level of management of members of this group may be denoted as $|\neg i|$. The class of edges from the superior of group i to $\neg i$ nodes may be defined as $E^{s(i),\neg i} = |\neg i|$ in each direction, with the sum of weights denoted $W^{s(i),\neg i}$.

In one example, the Weighted Random Graph (WRG) approach may be used, as described herein. In another example, the Bernoulli Weighted Random Network (BWRN) technique may be used, as described herein.

The group structure identification operations may include assigning management roles to selected node(s). An arbitrary number of management hierarchy levels may be assigned. It may be appreciated that some networks may include relatively small groups. In one nonlimiting example, a maximum number of hierarchy levels may be three. However, this disclosure is not limited in this regard. A number of nodes assigned to each hierarchy level greater than one may be related to a total number of groups at an immediately lower level. For example, for a maximum number of hierarchy levels of three, a third level of management corresponds to a relatively highest authority node in a corresponding local network. As used herein, a "boss" corresponds to a highest authority node. As used herein, a manager corresponds to a node at a second level, i.e., one level below the highest authority node. The first level of hierarchy may then include the remaining nodes organized into groups. As used herein, the remaining nodes, at the first level of hierarchy, are members. In some embodiments, a network generator, according to the present disclosure, may be configured to find group managers, without any information from network investigators, i.e., without corresponding information from the actual network. It may be appreciated that managers may serve as intermediaries between the boss and the members. In one nonlimiting example, a relatively small company may have a ratio of four employees per manager. In another nonlimiting example, a covert network may have a ratio of close to six. It is contemplated that reasons for this difference may include self-motivation of the members for doing their tasks, and/or limiting a fraction of the organization members interacting with the boss for safety reasons.

It may be appreciated that not all groups may be supervised through hierarchical management. As used herein, a group that is not supervised through hierarchical management is independent. A group of relatively small size and with a relatively low fraction of reciprocal connections is relatively more likely to be independent. In one nonlimiting example, a group whose members have only outgoing edges targeting outside nodes may be independent. Thus, members of an independent group may not have incoming edges from any other node in the network.

Thus, the group structure identification module 124 may be configured to receive the anonymized input data 122, to perform group structure identification operations, as described herein, and to produce group structure data 128 as output.

A next (i.e., third) set of operations may be performed by the synthetic random network generation module 126. The synthetic random network generation module 126 is configured to receive group structure data 128, and to perform the synthetic random network generation operations to produce the synthetic network data 130. The synthetic network data 130 may then be used to analyze one or more synthetic networks that correspond to the original network.

The next (i.e., third) set of operations may further include synthetic random network generation operations. In an embodiment, synthetic random network generation operations may correspond to an extension of a stochastic block model (SBM). The extension may include support for weighted directed edges with integer weights. Inputs for the synthetic random network generation operations may include lists of network nodes, lists of edges with integer weights, and lists of groups in the original network, as described herein. A first operation in the set of synthetic random network generation operations may include counting, for each group, a sum of weights of all edges inside the group. The operations may further include counting edges of the group leading to and from each other group. Probabilities based, at least in part on the sums may be determined by dividing each the sum of weights of all edges inside the group by a sum of weights of all the network edges. In one nonlimiting example, a numpy random choice technique may be used, by a baseline generator to select a pair of groups, including those in which the source and target groups are the same. It may be appreciated that the numpy random choice technique may be configured to select random samples of a one-dimensional array. However, this disclosure is not limited in this regard. A node from the source group and a node from the target group may then be selected repeatedly until the selected nodes are different. Thus, self-loops may be avoided. A probability, for the selected group, may then be selected from the created set of probabilities. A Bernoulli trial may then be executed with the selected probability. On success of the trial, the weight of connection between these two nodes may be increased by one. The entire process may be repeated until the total weight of all edges becomes the same as in the input network. In some embodiments, a Louvain community detection may be run on the resulting network and the output may be compared the output with the original network communities, e.g., to test the model.

Thus, a method, apparatus, and/or system, according to the present disclosure, is configured to generate a set of synthetic networks, with each synthetic network structurally similar to an original network. Each synthetic network may contain a plurality of anonymous nodes that are interconnected or clustered similar to, but slightly different from, the nodes in the original network. In one nonlimiting example, the synthetic networks may then be used to train research and/or analytical tools for finding structure and/or dynamics of actual covert networks.

The synthetic networks may support a plurality of alternative interpretations of the data regarding the original network. A distribution of probabilities for the alternative interpretations may enable users of the data to quantify statistically expected outcomes of operations on the covert networks. The distribution of probabilities for the alternative interpretations may provide an indication whether the data collected for selected covert network is sufficient for reliably interpreting the selected network's structure and/or dynamics. For example, a relatively high frequency of alternative interpretations of the original network structure may make them relatively more likely candidates for ground truth structure. Additional data may then support a determination of which interpretation relatively more likely corresponds to a true structure of the original network.

Figure 2:
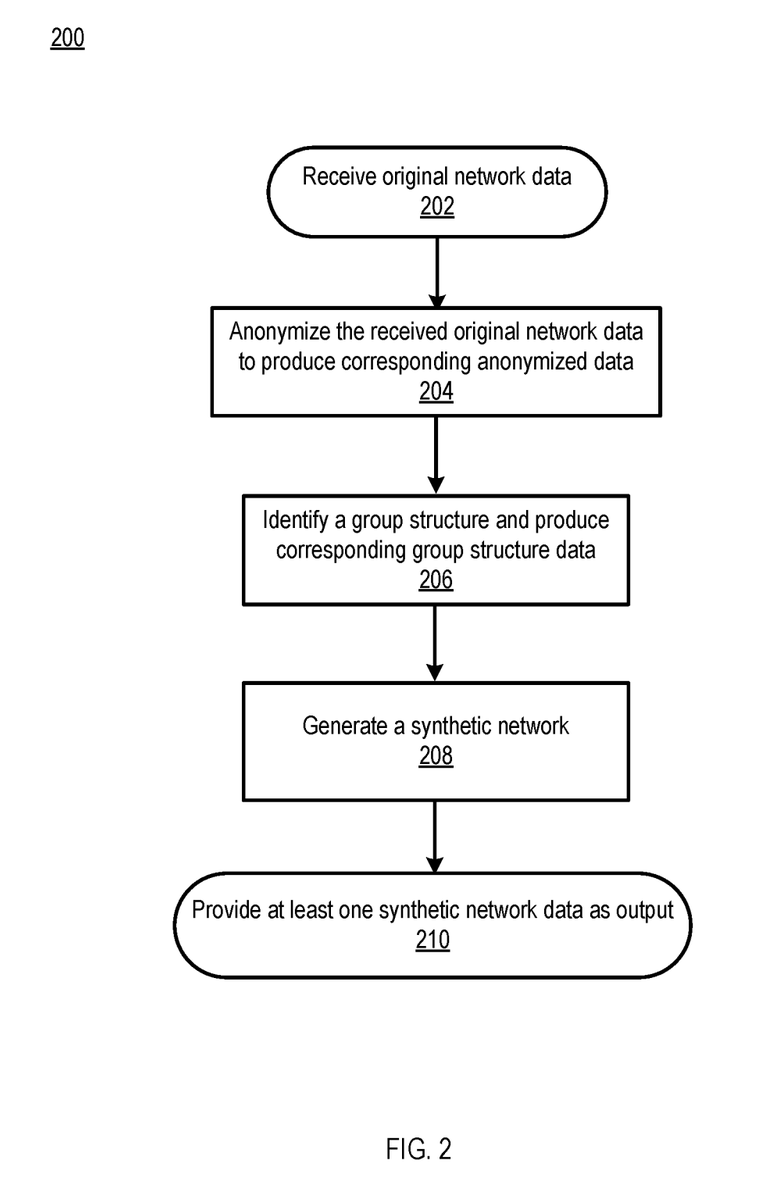
FIG. 2 is a flowchart of synthetic network generation operations, according to various embodiments of the present disclosure.

FIG. 2 is a flowchart 200 of synthetic network generation operations, according to various embodiments of the present disclosure. In particular, the flowchart 200 illustrates anonymizing original network data, identifying a group structure and generating a set of synthetic networks based, at least in part, on the original network data. The operations may be performed, for example, by the synthetic network generator system 100 (e.g., data anonymization module 106, group structure identification module 124 and/or synthetic random network generation module 126) of FIG. 1.

Operations of this embodiment may begin with receiving original network data at operation 202. The original network data may be actual network data or synthetic network data. Operation 204 includes anonymizing the received original network data to produce corresponding anonymized data. Operation 206 includes identifying a group structure and producing corresponding group structure data. Operation 208 includes generating a synthetic network. At least one synthetic network data may be provided as output at operation 210.

Thus, at least one synthetic network may be generated based, at least in part, on original network data that may be anonymized.

As used in any embodiment herein, the terms "logic" and/or "module" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may include, for example, singly or in any combination, hard-wired circuitry, programmable circuitry such as computer processors comprising one or more individual instruction processing cores, state machine circuitry, and/or firmware that stores instructions executed by programmable circuitry. The logic and/or module may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

Memory 112 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A method of generating synthetic networks for uncovering a covert network, the method comprising:
   receiving, by a group structure identification module, anonymized input data related to an original network, the original network having a first structure, the anonymized input data comprising an anonymized list of nodes, a list of edges and a list of groups;
   determining, by the group structure identification module, for each pair of nodes, a probability of an edge between the pair of nodes, a resulting list of probabilities corresponding to a summary group structure; and
   generating, by a synthetic random network generation module, a plurality of synthetic random networks based, at least in part, on the determined probabilities, each of the plurality of synthetic random networks having a respective second structure that is different than each other respective second structure and the first structure of the original network; and
   analyzing each of the respective second structures and the first structure to determine whether the original network is a covert network.

2. The method of claim 1, further comprising classifying, by the group structure identification module, each edge into a selected class, and generating, by the group structure identification module, a corresponding randomized weight for each class separately.

3. The method of claim 1, wherein the original network is selected from the group comprising an actual network or another synthetic network.

4. The method of claim 1, wherein each of the plurality of synthetic random networks are statistically similar.

5. The method of claim 1, further comprising generating, by a data anonymization module, the anonymized input data.

6. The method of claim 1, wherein the anonymized input data further comprises incorrect data related to the original network.

7. The method of claim 1, wherein the list of nodes comprises a plurality of node records, each node record comprising a unique node identifier and a management hierarchy indicator, the list of edges comprises a plurality of edge records, each edge record comprising a starting node identifier, an ending node identifier, and an edge weight, and the list of groups comprises at least one group record, each group record comprising a list of node identifiers corresponding to members of the group.

8. The method of claim 1, further comprising assigning, by the group structure identification module, a randomized weight to each weighted edge using at least one of a weighted random graph technique and/or a Bernoulli weighted random network technique.

9. The method of claim 1, wherein the generating the plurality of synthetic random networks correspond to an extension of a Stochastic block model.

10. The method of claim 1, further comprising assigning, by the group structure identification module, a management role to a selected node.

11. A computer program product for generating synthetic networks for uncovering a covert network, comprising software instructions stored on a non-transitory computer-readable medium and executable by a processor for:
    receiving, by a group structure identification module, anonymized input data related to an original network, the original network having a first structure, the anonymized input data comprising an anonymized list of nodes, a list of edges and a list of groups;
    determining, by the group structure identification module, for each pair of nodes, a probability of an edge between the pair of nodes, a resulting list of probabilities corresponding to a summary group structure; and
    generating, by a synthetic random network generation module, a plurality of synthetic random networks based, at least in part, on the determined probabilities, each of the plurality of synthetic random networks having a respective second structure that is different than each other respective second structure and the first structure of the original network; and
    analyzing each of the respective second structures and the first structure to determine whether the original network is a covert network.

12. The product of claim 11, wherein the group structure identification module is further configured to classify each edge into a selected class, and to generate a corresponding randomized weight for each class separately.

13. The product of claim 11, wherein the original network is selected from the group comprising an actual network or another synthetic network.

14. The product of claim 11, wherein each of the plurality of synthetic random networks are statistically similar.

15. The product of claim 11, further comprising a data anonymization module configured to generate the anonymized input data.

16. The product of claim 11, wherein the anonymized input data further comprises incorrect data related to the original network.

17. The product of claim 11, wherein the list of nodes comprises a plurality of node records, each node record comprising a unique node identifier and a management hierarchy indicator, the list of edges comprises a plurality of edge records, each edge record comprising a starting node identifier, an ending node identifier, and an edge weight, and the list of groups comprises at least one group record, each group record comprising a list of node identifiers corresponding to members of the group.

18. The product of claim 11, wherein the group structure identification module is configured to assign a randomized weight to each weighted edge using at least one of a weighted random graph technique and/or a Bernoulli weighted random network technique.

19. The product of claim 11, wherein the generating the plurality of synthetic random networks correspond to an extension of a Stochastic block model.

20. The product of claim 11, wherein the group structure identification module is configured to assign a management role to a selected node.

* * * * *